Dec. 9, 1941.    J. H. HOERN    2,265,561
METHOD OF MAKING VALVE TAPPETS
Filed April 27, 1938    2 Sheets-Sheet 1
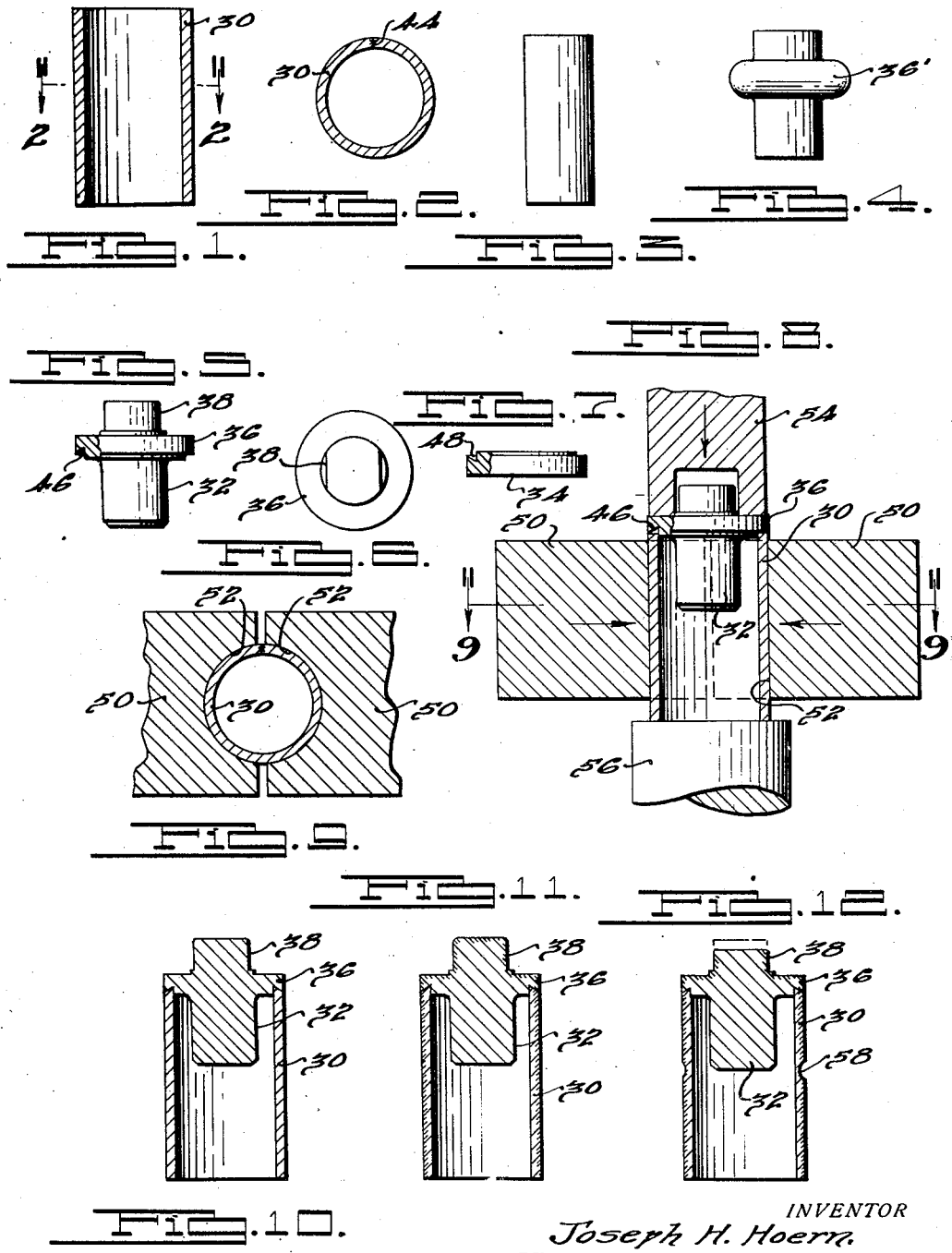
INVENTOR
Joseph H. Hoern.
BY Harness, Dickey & Pierce.
ATTORNEYS.

Dec. 9, 1941.   J. H. HOERN   2,265,561
METHOD OF MAKING VALVE TAPPETS
Filed April 27, 1938   2 Sheets-Sheet 2
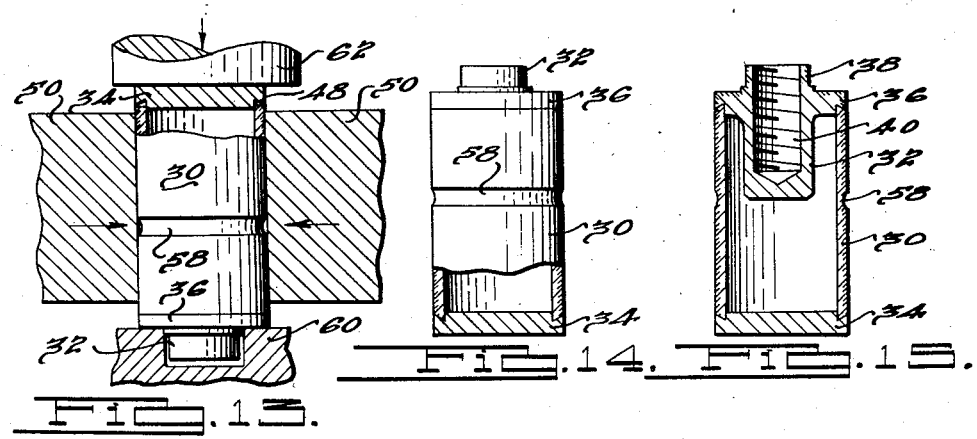
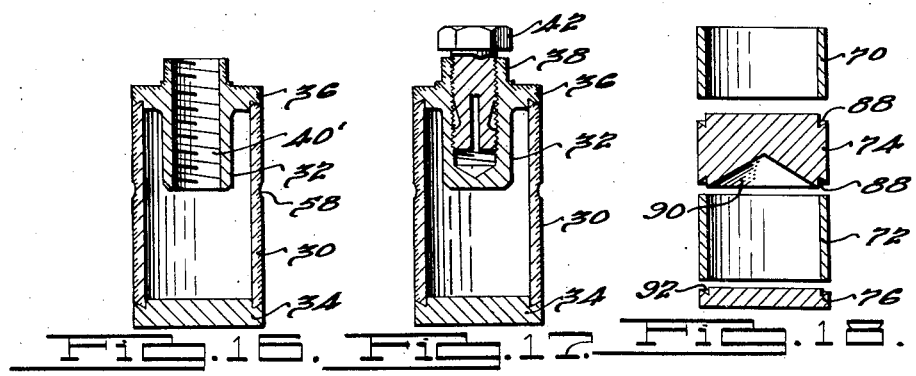
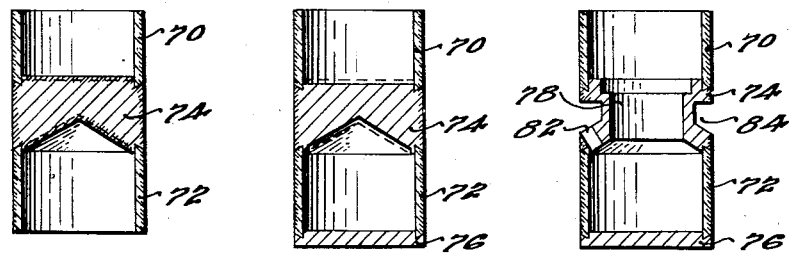
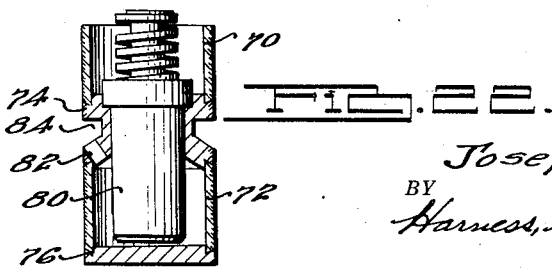
INVENTOR
Joseph H. Hoern.
BY
Harness, Dickey & Pierce.
ATTORNEYS.

Patented Dec. 9, 1941

2,265,561

UNITED STATES PATENT OFFICE 2,265,561

METHOD OF MAKING VALVE TAPPETS

Joseph H. Hoern, Birmingham, Mich., assignor to Eaton Manufacturing Company, Cleveland, Ohio, a corporation of Ohio Application April 27, 1938, Serial No. 204,692

2 Claims. (Cl. 29—156.7)

This invention relates to a method of making valve tappets and particularly valve tappets of the barrel type, the principal object being the provision of a method of making such tappets that will enable the production of a high quality tappet at a minimum cost.

Objects of the invention include the provision of a method of making a barrel type valve tappet by constructing a plurality of parts independently of one another and securing the parts together to form the completed tappet; the provision of a method of making a tappet of the type described in which at least one of the parts is initially formed from sheet metal and is welded to at least one of the other parts; and the provision of a method of making a barrel type valve tappet including the step of assembling parts to form a hollow structure and then heating the structure and quenching it as a whole to harden at least portions thereof.

Other objects of the invention include a method of making a multi-part tappet, certain portions of which are formed from a hardenable steel and other portions of which are formed from a non-hardenable steel, the latter portions being welded together, their exterior surfaces carbonized, then welded to the hardenable steel portions, and then the entire assembly heated and quenched whereby to provide a tappet having a hardened exterior surface; the provision of a method of making a valve tappet including the steps of forming a plurality of independent parts at least one of which is formed of a steel capable in and of itself of being hardened by heating and quenching and at least two of the remaining parts being formed of a steel which in and of itself is incapable of being hardened by heating and quenching, the last mentioned parts being permanently secured together, the exterior surfaces thereof carburized, all of the parts welded together and then heated and quenched whereby to provide a tappet having a hardened exterior surface throughout; the method of making a valve tappet comprising forming the cam contacting face thereof of a material having the characteristics of becoming hardened throughout by heating and quenching and the main body portion formed of a material which in and of itself is incapable of being materially hardened by heating and quenching, the main body portion being carburized whereby to provide it with an exterior surface of greater carbon content than it originally possessed, welding the main body portion and the cam contacting portion together, subjecting the assembly to a preliminary machining operation, and then heating and quenching the entire assembly whereby to provide a tappet, all of the wearing surfaces of which are hardened; the provision of a method of making barrel type valve tappets in which the main body portion is formed of a suitable length of tubing and opposite end members of the same diameter of the tubing are welded thereto by a resistance welding operation; and the provision of a method of making a barrel type valve tappet comprising forming a hollow cylindrical main body portion from sheet metal, forming an end member of hardenable material for one end of the main body portion, upsetting a length of wire or rod for forming an opposite end member and welding all of the members together.

Other objects of the invention include the provision of a method of making a valve tappet wherein at least a portion of the tappet is sealed against the entrance of foreign material thereto during a subsequent hardening operation; the provision of a method of making a tappet wherein a plurality of parts are joined together to form a completed article and in which the article may be hardened as a whole prior to completing major machining operations thereon; and the provision of a method of making a tappet so that precautions may be taken to guard against the production of scale on at least certain interior portions of the tappet during the hardening operation, yet which will permit major machining operations to be performed on the tappet subsequent to the hardening operation.

Further objects of the invention include the provision of a novel method of welding a thin walled semi-cylindrical tube to an end member without requiring the use of shoulders or the like on the tube to effect a welding operation; the method of welding a thin cylindrical tube forming the main body portion of a barrel type valve tappet to an end member by a resistance welding operation; and the provision of a method of welding a thin tubular main body portion of a valve tappet to an end member therefor without the necessity of providing radially projecting abutments on the main body member and yet minimizing the belling of the welded end thereof.

The above being among the objects of the present invention the same consists in certain novel steps and combination of steps of operation to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a sectional view taken axially through a length of tubular stock to be employed as the main body portion of a barrel type valve tappet;

Fig. 2 is a transverse sectional view of the length of tubular stock shown in Fig. 1 taken as on the line 2—2 thereof;

Fig. 3 is a side elevational view of a length of wire or rod such as is employed to eventually produce one of the end members for a barrel type of tappet;

Fig. 4 is a side elevational view of the piece of stock shown in Fig. 3 after it has been subjected to a suitable upsetting operation to form a peripherally extending flange thereon;

Fig. 5 is a partially broken, partially sectioned side elevational view of the piece of stock shown in Fig. 4 after its initial machining operation;

Fig. 6 is a plan view of the part shown in Fig. 5;

Fig. 7 is a partially broken edge elevational view of the opposite end member for the valve tappet;

Fig. 8 is a partially broken, partially sectioned elevational view illustrating the apparatus for and the manner of welding the end members shown in Figs. 5 and 6 to the main body portion shown in Figs. 1 and 2;

Fig. 9 is a transverse sectional view taken on the line 9—9 of Fig. 8;

Fig. 10 is a sectional view taken axially of the main body portion and end member welded thereto by the operation illustrated in Figs. 8 and 9;

Fig. 11 is a view similar to Fig. 10 but illustrating the assembly after it has had its surface carburized;

Fig. 12 is a view similar to Figs. 10 and 11 but illustrating the same after certain initial machining operations thereon including the removal of the carburized end surface of the end member so as to prevent subsequent hardening thereof in a hardening operation; and the formation of a central oil retaining groove in the main body portion thereof;

Fig. 13 is a view similar to Fig. 8 but illustrating the step of welding the opposite end member to the main body portion of the tappet;

Fig. 14 is a partially broken, partially sectioned side elevational view of the valve tappet after the operation disclosed in Fig. 13;

Fig. 15 is a sectional view taken centrally through the valve tappet in the condition of completion shown in Fig. 14 but with one of the end members centrally drilled and tapped to provide a blind opening therein for the reception of an adjusting screw;

Fig. 16 is a view similar to Fig. 15 but showing a modification of the drilling and tapping operation in which one end member is drilled completely through the same;

Fig. 17 is a view similar to Fig. 15 but illustrating the application of a suitable type of adjusting screw to the tappet;

Fig. 18 is an exploded sectional view taken axially through initially independently formed parts employed for constructing a modified form of valve tappet;

Fig. 19 illustrates three of the parts shown in Fig. 18 after an initial operation in which these parts are welded together and their surfaces carburized;

Fig. 20 is a view similar to Fig. 19 but illustrating the remaining member of the assembly welded in place;

Fig. 21 is a view similar to Fig. 20 but illustrating the condition of the same after it has been hardened, the central member machined away and the exterior surface brought to finished form; and, Fig. 22 is a view similar to Fig. 21 but showing the application of a hydraulic adjusting means thereto.

As is well understood in the art barrel type valve tappets are usually made hollow for the sake of lightness and economy in manufacture. Two general methods are followed in the production of these valve tappets, the first of which is to cast the same and in the casting operation to provide means for chilling that end which is to engage a valve operating cam so as to provide a hard wear resisting surface for engagement with the cam, and the second is to form the tappet from steel with at least that end thereof which is to engage the cam formed from a steel of hardenable character so that it may be heated and quenched to obtain the desired hard wear resisting cam engaging surface. The present invention deals with the latter type of construction.

In accordance with the present invention the main body portion of the tappet is formed at least in part of a tube or tubes having a constant wall thickness throughout during substantially all phases of the operation of producing the tappet, thus making the tappet particularly economical to manufacture. In order to fully illustrate the present invention two somewhat different tappet structures are shown in the drawings and described, the first of these a construction of which is illustrated in Figs. 1 to 17, inclusive, relates to a barrel type tappet which is adapted to embody a manually adjustable screw means for controlling the clearance between the tappet and the valve in operation and the specific construction of which is shown and claimed in my co-pending application for Letters Patent of the United States for Improvements in valve tappets, filed April 19, 1938, and serially numbered 202,928, patented November 7, 1939, No. 2,178,724. The second of these tappets the method of the construction of which is illustrated in Figs. 18 to 22, inclusive, is that type of tappet which is adapted to receive a cooperating automatic hydraulic valve clearance adjusting mechanism and the specific construction of the tappet itself forms the subject-matter of my co-pending application for Letters Patent of the United States for Improvements in valve tappets, filed May 7, 1938, and serially numbered 206,555, patented March 14, 1939, No. 2,150,444.

Referring now to the type of tappet the various stages of manufacture of which are illustrated in Figs. 1 to 17, inclusive, and particularly to Fig. 17 which discloses the completed article, it will be noted that the tappet there shown comprises a cylindrical hollow body portion 30 closed at one end by an end member 32 and closed at its opposite end by an end member 34. The end member 34 comprises essentially a disc welded to the corresponding end of the main body portion 30. The end member 32 comprises a cylindrical body portion having a radially outwardly extending annular flange 36 formed integrally therewith intermediate its ends and which flange is welded to the corresponding end of the main body portion 30. That portion of the end 32 projecting above the flange 36 is flatted off at its opposite sides as at 38 to enable it to be held by a wrench during a valve clearance adjusting operation. The end member 32 in the form shown in Fig. 17 is provided with a blind opening 40 therein disposed in axially concentric relation with the axis of the tappet and this opening is threaded for reception of the adjusting screw 42. Any suitable type of adjusting screw may be employed in connection with the tappet shown, the particular adjusting screw 42 shown being that forming the subject-matter of United States Letters Patent No. 2,035,055, granted March 24, 1936, to Harold I. Dyer and owned by the assignee of the present invention, it being of a self-locking type eliminating the necessity of employing a lock nut in connection therewith.

Referring now to Figs. 1 to 17, inclusive, the main body portion of the tappet is initially formed independently of the remaining parts of the tappet and as illustrated in Figs. 1 and 2 comprises a length of tubing 30 of suitable and constant wall thickness throughout. In the broader aspects of the invention the main body portion 30 may comprise a length of seamless tubular steel stock of suitable analysis but in accordance with a more limited phase of the present invention it is preferably formed from a sheet of metal bent into a cylindrical tube and welded at the joint 44 thus formed. It may be formed from a more or less rectangular piece of sheet metal having one dimension corresponding to the desired length of the main body portion 30 and of a width corresponding with the circumference thereof and bent into cylindrical form so as to bring the opposite side edges into abutting relationship and welding them together as at 44 in Fig. 2. On the other hand it may comprise a suitable length of that type of tubing which is conventionally constructed of strip stock of a width corresponding to the circumference of the desired product, bent into cylindrical conformation about a line parallel to the length of the strip and welding the subsequently abutting side edges together in accordance with methods conventionally employed in forming welded steel pipes or tubes. In the latter case the pipe or tube thus formed will be severed in suitable lengths corresponding to the length desired in the main body portion as illustrated in Fig. 1.

In the broader aspects of the present invention the main body portion 30, regardless of its method of manufacture, may be of a type of steel that has the characteristics of becoming hard upon heating and quenching in a conventional manner and while it will be appreciated that a number of various types of steel are suitable for use in such case and that usually the carbon content of such steel will vary in accordance with the surface hardness desired for the main body part of the finished tappet in such case, one type of steel that is suitable for use in such case, and where it is desired that the main body portion of the tappet in its completed form will have a hardness of approximately 40 Rockwell, type C, is that known as SAE #1035 having the following analysis.

| Carbon | Manganese | Phosphorus | Sulphur | Balance |
|---|---|---|---|---|
| Per cent 0.30–0.40 | Per cent 0.60–0.90 | Per cent [1] 0.045 | Per cent [1] 0.055 | Principally iron. |

[1] Maximum.

It is, however, preferable in accordance with a more limited phase of the present invention that the main body portion 30 be formed of a low carbon steel, that is a steel not having a sufficient carbon content to be materially hardened in and of itself upon heating and quenching. An illustrative example of such steel is that known as SAE #1020 having the following analysis.

| Carbon | Manganese | Phosphorus | Sulphur | Balance |
|---|---|---|---|---|
| Percent 0.15–0.25 | Percent 0.30–0.60 | Percent [1] 0.045 | Percent [1] 0.055 | Principally iron. |

[1] Maximum.

As will hereinafter be more fully explained when this latter type of low carbon steel is employed for the main body portion the operation of constructing the tappet will include a step of carburizing the main body portion so that in a subsequent heating and quenching operation the surface thereof will be caused to assume the desired hardness required for long life in operation.

The end member 32 may be formed from the same type of steel that the main body portion 30 is formed from and as above described. In other words it may be formed from a type of steel an illustrative example of which is SAE steel #1035 the analysis of which has been set out above and in which case it will become hardened when heated and quenched, or, as will usually be preferable, particularly in accordance with a more limited phase of the present invention, it may be formed from a steel of which SAE steel #1020, the analysis of which has been given above, is an illustrative example. In either case in forming the end member 32 in accordance with a preferred method, a suitable piece of cylindrical steel stock of substantially the diameter of the main body portion of the end 32 is initially provided and as illustrated in Fig. 3. This stock will usually be obtained in the form which is commercially known as wire, although it may equally well be employed in the form which is commercially known as rods. In either case the stock in the condition shown in Fig. 3 is subjected to a suitable upsetting operation during which a portion of its length is upset to form a peripherally extending enlargement or flange such as the flange 36' illustrated in Fig. 4. For the sake of economy this operation is preferably accomplished as a cold heading operation the significance of which will be readily understood by those skilled in the art. It will be observed that in supplying the metal required for the flange 36' the length of the initial piece is materially shortened, it now being slightly longer than that desired in the finished part.

The part thus brought to the condition illustrated in Fig. 4 is then subjected to a suitable machining operation to bring its exterior configuration into substantial conformance with that desired in the finished product. In other words the flange 36' is machined to form the final flange 36 as illustrated in Fig. 5, the ends of the member are preferably squared, and preferably the flats 38 are machined on the member at this stage of operation although this particular step may be delayed if desired. Where the tappet is to be later case hardened the flats 38, however, are advantageously machined at this point of operation so that in the final product the flats 38 will be hardened to thereby resist deformation upon engagement by a wrench. It will also be noted that in this machining operation the lower face of the flange 36 adjacent its outer margin is machined to provide an annular step-like recess 46 of wedge-like conformation therein, the inner wall of the recess being cylindrical in conformation and with its axis parallel to the axis of the end member 32 and with its outer surface of frusto-conical conformation converging towards the outer end of the tappet. It may also be noted that the outer edge of the flange 36 at the point where the just mentioned frusto-conical surface of the groove 46 intersects the same is axially offset outwardly of the end 32 from the lower end of the inner face of the groove 46, this having the effect of forming a pilot for receiving the main body portion 30 during the welding operation to be later described. The hole 40 may also be drilled and tapped in the end member 32 at this stage of operation, but it will usually be delayed until after the end member 32 and main body portion 30 has been welded together to insure absolute alignment of the hole with the body.

The end member 34 which is shown in Fig. 7 in its initially formed state is as previously described of a disc-like nature. In other words it is a relatively thick disc or a short cylinder, of substantially the same diameter as the main body portion 30 and flange 36, and its upper marginal edge is formed to provide a groove 48 identical in all respects to the groove 46 previously described except reversed in direction. Inasmuch as the end member 34 constitutes that end of the tappet providing a surface for contact with the usual valve operating cam of an internal combustion engine, it is essential that it be of the character to resist wear because of a rubbing action of the cam thereon and of sufficient strength to withstand impact of the cam to which it will be subjected in service in many instances. For the latter reason the end member 34 is made of a greater thickness than the main body portion 30 for instance. Because of the requirement for wear resisting qualities it is also necessary that the end member 34 be provided with a face for engagement with a cam of considerably greater hardness than that previously mentioned as acceptable for the main body portion 30. In other words it is preferable that the operative face of the end member 34 have a hardness of approximately 60 Rockwell, class C or greater. Where in the later steps of manufacture the end member 34 is welded to the main body portion 30 before the main body portion 30 is carbonized where such practice is followed, it is preferably formed of a material which will be advantageously affected by such carbonizing steps and because thereof will be hardened when heated and quenched to a greater degree than when not carburized. An illustrative example of such type of steel is that known as SAE #3115 having the following analysis.

| Carbon | Manganese | Phosphorus | Sulphur | Nickel | Chromium | Balance |
|---|---|---|---|---|---|---|
| Percent 0.10-0.20 | Percent 0.30-0.60 | Percent [1] 0.040 | Percent [1] 0.050 | Percent 1.00-1.50 | Percent 0.45-0.75 | Principally iron. |

[1] Maximum.

Where the end member 34 is not to be secured to the main body portion 30 until after the same has been carbonized where such step is followed, or in cases where the main body portion 30 is initially formed of a steel that is hardenable in and of itself upon heating and quenching as in the case previously explained, it is preferably formed of a material that will provide the desired hardness of its operating face upon being subjected to a suitable heating and quenching operation. An illustrative example of a suitable steel to use under such circumstances is SAE steel #52100 having the following analysis.

| Carbon | Manganese | Phosphorus | Sulphur | Chromium | Balance |
|---|---|---|---|---|---|
| Percent 0.95-1.10 | Percent 0.20-0.50 | Percent [1] 0.030 | Percent [1] 0.035 | Percent 1.20-1.50 | Principally iron. |

[1] Maximum.

The next step in the operation of forming the tappet comprises the step of welding the end member 32 to the main body portion 30 and this is preferably accomplished in accordance with the present invention in the manner illustrated in Figs. 8 and 9. As illustrated in these figures the main body portion 30 is grasped between a pair of electrodes 50, the electrodes 50 each having a semi-cylindrical recess 52 at its operative end as best illustrated in Fig. 9, the diameter of which is substantially identical to that of the main body portion 30, and the recesses 52 are arranged in opposed relation so as to enable them to grip the main body portion 30 therebetween in substantially completely embracing relation. The recesses 52 are not quite completely semicircular so that when the electrodes 50 grasp the main body portion 30 therebetween their adjacent ends will remain in substantial spaced relation as illustrated in Fig. 9. As best illustrated in Fig. 8 in accordance with the present invention the main body portion 30 is so positioned between the electrodes 50 that only a small portion of its length projects above the upper faces of the electrodes 50. The amount which the upper end of the main body portion thus projects above the upper face of the electrodes 50 in accordance with the present invention will vary in accordance with the thickness of the walls of the main body portion but in general it may be stated that the amount of such projection should not exceed three times the thickness of the walls of the main body portion. In other words where the main body portion 30 has an outside diameter of one inch and a wall thickness $\frac{1}{16}$ of an inch it should not project upwardly beyond the upper surface of the electrodes 50 more than $\frac{3}{16}$ of an inch and preferably in the neighborhood of $\frac{1}{8}$ of one inch. It will be understood that the two electrodes 50 cooperate to serve as a single electrode during the welding operation.

With the main body portion grasped between the electrodes 50 as described the end member 32 is then assembled thereto in the manner illustrated in Fig. 8, the pilot described in connection with Fig. 5 and formed by undercutting the lower marginal edge of the flange 36 to form the groove 46 serving to center the end member 32 in the upper end of the main body portion 30, this providing a more or less limited area of contact between the end member 32 and the main body portion 30. The sharp edge formed at the lower peripheral edge of the flange 36 by the frusto-conical surface of the groove 46 abuts the outer marginal edge of the end of the main body portion 30 to make line contact therewith, or, where the diameter of the flange 36 is slightly greater than that of the main body portion 30 the sharp corner formed at the junction of the periphery of the main body portion 30 and its upper end face will form a line contact with such frusto-conical face of the end member. In any event the remaining electrode 54 is arranged to move axially of the main body portion 30 and end members 32 when gripped between the electrodes 50 and to bear against an upwardly exposed face of the end member 32. Preferably the electrode 54 is provided with a recessed end so that its effective area of contact is with the upper face of the flange 36 directly over the walls of the main body portion 30. A stop such as 56 is preferably provided below the electrodes 50 not only to serve as a gauge for positioning the main body portion 30 in properly axially related relation with respect to the electrodes 50 but also to insure against axial displacement of the main body portion 30 in the electrodes 50 during the welding operation. It is also preferable in order to positively eliminate belling of the end of the tube 30 being welded, during the welding operation illustrated in Figs. 8 and 9, that the electrodes 50 be urged inwardly towards one another under a greater pressure than that urging the electrode 54 downwardly. For example where the main body portion 30 is of the size and wall thickness above mentioned it has been found preferable to urge the electrodes 50 towards one another under a pressure of in the neighborhood of 6,000 pounds.

With the arrangement thus described and with the electrode 54 and electrodes 50 connected in a suitable electrical circuit, the electrode 54 is urged downwardly and the resistance to the flow of the electrical energy between the flange 36 of the end member 32 and the main body portion 30 will cause the upper projecting end of the main body portion 30 to become more or less plastic so as to completely flow into and fill the groove 46 and to cause the material of the main body portion 30 and the end member 32 to intimately weld together and thus effect an integrating union of the two parts. No appreciable belling of the open end of the main body portion 30 will occur during this welding operation principally because of the limitation in the extent to which it projects above the upper surface of electrodes 50 as above set out, but also because of the conformation of the groove 46 which has a tendency of confining or wedging the upper end of the main body portion 30 within the groove 46. Also because of the shape of the groove and the formation of the pilot portion on the end member 32 adjacent the groove as above described substantially no flash will be formed interiorly of the main body portion 30 during the welding operation. It will be understood that as soon as the welding operation is completed the electrode 54 is withdrawn, thus interrupting the flow of current through the members 30 and 32, and the electrodes 50 are withdrawn so as to release the assembly thus formed from between them. This assembly has now assumed the condition illustrated in Fig. 10 in which the main body portion 30 and end member 32 are intimately secured together over their entire area of contact.

After the assembly has reached the condition illustrated in Fig. 10, if the main body portion is formed of a material such as the example first given which is capable of being hardened in its original condition upon a suitable heating and quenching operation, then the remaining end member 34 may be welded to the remaining open end of the main body portion as suggested in Fig. 13. Even though the assembly shown in Fig. 10 is to be carburized, the end member 34 may be welded to it at this stage of operation in the manner suggested in Fig. 13 if the end member 34 is formed of a material which requires or is not adversely affected by a carburizing step, in other words if it is formed of a material such as SAE #3115 steel previously mentioned. Where, however, the end member 34 is formed of a material which is hardenable in and of itself by a suitable heating and quenching operation, as in the case where it is formed of SAE steel #52100 as above described, the assembly shown in Fig. 10 is then subjected to a suitable carburizing step which may be accomplished in any suitable or conventional manner, as for instance, packing in bone black and heating. Suitable precautions may be taken during this carburizing step to prevent carburization of the interior surfaces of the assembly in which case only the outer surfaces thereof will be carburized as a result of the operation and as illustrated in Fig. 11, otherwise both outer and inner surfaces of the assembly will be carburized as will be readily understood.

After the assembly has reached the condition of completion illustrated in Fig. 11, if the end member 34 has already been welded to the assembly, the hole 40 may be drilled and tapped in the end member 32, the assembly subjected to any other suitable machining operation that may be desirable or necessary at this time as, for instance, forming a peripheral oil groove 58 in the exterior surface of the main body portion 30, and then hardened, but where the end member 34 is formed of a material hardenable in and of itself upon suitable heating and quenching the assembly shown in Fig. 11 and where the drilling and tapping of the hole 40 is to be delayed until a later step of operation, it is machined to form the groove 58 and to remove the carburized outer end of the end member 32, as illustrated in dotted lines in Fig. 12 so that in a later hardening step such end will remain soft and will permit the same to be drilled and tapped after hardening to provide the hole 40.

Assuming that the assembly thus far described is such as to require carburization and as having been carburized it is now in condition to have the end member 34 welded thereto and this is accomplished in the manner illustrated in Fig. 13.

Referring to Fig. 13 it will be noted that the same electrodes 50 as employed in the first welding operation described are employed in the second welding operation. The assembly shown in Figs. 10, 11 or 12 as the case may be is inserted and gripped between the electrodes 50 with the remaining open end of the main body portion projecting above the upper surfaces thereof an amount corresponding to the amount described in connection with the first welding operation. A stop 60 corresponding to the stop 56 previously described is employed for maintaining the axial position of the assembly between the electrodes 50 and for initially locating it axially therebetween. The end member 34 is assembled to the remaining open end of the main body portion in the manner illustrated in Fig. 13, and which is substantially the same manner that the end member 32 was initially assembled thereto as described in connection with Figs. 8 and 9, the remaining electrode 62 corresponding to the electrode 54 previously described is pressed downwardly upon the upper surface of the end member 34 as thus positioned and an electric current is caused to flow between it and the electrodes 50, through the body portion 30 and end member 34 causing the latter to be welded together in substantially the identical manner described in connection with the welding of the end member 32 to the main body portion 30.

The resulting assembly which is illustrated in Fig. 14 is now complete as far as the securement of the various parts together is concerned and it will be noted that its interior is hermetically sealed against the entrance of any foreign material thereinto or the escape of any foreign material therefrom. The assembly in the condition illustrated in Fig. 14 is now in condition to be hardened and although the threaded opening 40 may be formed in it before the hardening step it will usually be preferable to delay this operation until the hardening step is completed except in cases where the end member 32 is formed of a hardenable material, this for the reason that the hardening operation usually causes the appearance of scale on the exposed surface of the article. It will be assumed in the present case that the assembly in the condition illustrated in Fig. 14 and before the hole 40 is drilled and tapped is subjected to a suitable heating and quenching operation whereby the tappet is hardened. Where all parts of the tappet including the end member 34 have been carbonized the carbonized surface of the tappet will, accordingly, be hardened during this operation and the core or inner part of these various portions will remain in a relatively soft condition better enabling them to withstand impact without breaking. Likewise where the hole 40 has been drilled and tapped before the carburizing operation the threaded surfaces of such openings will additionally be hardened. Where the end member 34 is formed of a material which is hardenable in and of itself and which has not been subjected to the carburizing step, the end member 34 will be of a uniform hardness throughout.

Where the exterior of the main body portion and end member 32 has been carburized and the operation of drilling and tapping the hole 40 has been delayed until after the hardening operation, and the ability to drill and tap the hole 40 provided by removing the upper carburized end of the end member 32 as illustrated in Fig. 12 so as to prevent the possibility of the same being hardened, this step of operation is now carried out as illustrated in Figs. 15 and 16. The difference between these two views is that in the construction shown in Fig. 15 the hole 40 is shown as a blind hole while in Fig. 16 the corresponding hole 40' is shown as extending completely through the end member 32. The construction shown in Fig. 15 will ordinarily be preferred in that it maintains the hermetically sealed condition of the interior of the tappet whereas the construction shown in Fig. 16 breaks this hermetically sealed condition. The construction shown in Fig. 16 is not at all objectionable for the reason that the interior of the tappet having been hermetically sealed during the hardening operation the possibility of foreign material having found its way thereinto as well as the possibility of the formation of a scale during the hardening operation within the interior of the tappet is completely eliminated. However, with the construction illustrated in Fig. 16 should the tappet be subjected to a washing operation after the hole 40' has been drilled therethrough, it will be obvious that because of the pocket formed between the inwardly projecting end portion of the end 32 and the surrounding walls of the main body portion 30 it will be impossible to completely drain any washing solution from the interior of the tappet and the presence of such solution in the tappet may cause rusting of the interior surfaces thereof.

The operation of drilling and tapping the hole 40 after the hardening operation may be one of several machining operations required to bring the tappet to its final form of completion and which operation will include grinding the exterior surface of the tappet to bring it to its final diametrical and axial dimensions as well as to the desired condition of finish. The tappet thus completed as illustrated in Figs. 15 and 16 is now ready to receive an adjusting screw in the threaded opening 40 or 40' as the case may be and the application of which to the tappet is illustrated in Fig. 17, the tappet then being in condition for assembly to an internal combustion engine.

It will be readily understood that the tappet thus formed as above described is lighter and more economical to manufacture than existing types of tappets, that because of its method of manufacture its interior is free from the inclusion of foreign material and particularly where the hole 40 is a blind hole the possibility of transfer of foreign material between the inside and the outside of the tappet is positively eliminated, it provides a tappet in which all wearing surfaces are of hardened nature conducive to long life in service, and provides an extremely strong and serviceable construction well adapted for the use intended.

The same general advantages in the manufacture of the tappet thus far described are also obtainable in the manufacture of the tappet construction illustrated in Figs. 18 to 22, inclusive. Not all of the steps of operation are illustrated in these figures for the reason that the essential steps in the manufacture having been described in connection with the construction illustrated in Figs. 1 to 17, inclusive, reference to the previously described steps will be sufficient to explain the mode of manufacture of the tappet in these later views.

This last form of tappet in its completed condition is shown in Fig. 21 without its accompanying hydraulic adjusting unit and in Fig. 22 with the same assembled thereto. This tappet comprises a main body portion formed from two spaced tubular portions 70 and 72, respectively, welded to an intermediate section 74 forming a guide for the hydraulic unit, and an end member 76 corresponding in function to the end member 34 previously described welded to the lower end of the member 72.

The intermediate member 74 is provided with a bore 78 of smaller diameter than the bore of the members 70 and 72 and slidably received therein the hydraulic unit which is indicated generally in Fig. 22 at 80. While the unit 80 may be of any suitable construction of the hydraulically operated type designed to automatically maintain the desired amount of clearance or to eliminate any clearance whatever between the cooperating valve operating cam, tappet and valve operated thereby, the particular unit illustrated is that shown and claimed in the application for Letters Patent of the United States of Carl Voorhies, filed April 14, 1938, and serially numbered 202,022 and which application is owned by the assignee of the present application. In any event it will be understood that the space between the hydraulic unit 80 and the inner walls of the member 72 constitutes an oil chamber or reservoir for the hydraulic unit 80 and the reservoir is adapted to be maintained full of oil during operation, the oil being introduced thereinto preferably through an opening such as 82 drilled through the intermediate member 74, the intermediate member 74 preferably being formed with a peripheral groove 84 therein into which the opening 82 opens. The groove 84 serves as a convenient means for conducting lubricant to the opening 82 regardless of the rotatable position of the tappet in its guiding bore.

In forming the tappet illustrated in Figs. 18 to 22, inclusive, the members 70 and 72 may be formed of the same materials and in the same manner as the main body portion 30 described in connection with Figs. 1 to 17, inclusive. The intermediate member 74 may be formed of the same material as the end member 32 described in connection with the construction shown in Figs. 1 to 17, inclusive, but it is preferably constructed from rod or bar stock by a suitable screw machine operation to the form illustrated in Fig. 18 in which it is solid throughout, the opposite marginal edges of its periphery grooved as at 88 to form grooves of the same character as the grooves 46 and 48 previously described, and preferably with a conical recess 90 in its lower face. One modification from the foregoing construction which may be noted at this point is that with the construction shown in Figs. 18 to 22, inclusive, it is preferable, where the tubular members 70 and 72 are formed from a material that is hardenable in and of itself upon heating and quenching such as the SAE steel #1035 previously mentioned, to form the intermediate member 74 from a material that is not hardenable in and of itself upon heating and quenching, in other words of a material such as the SAE #1020 steel previously described. In any event whether the members 70 and 72 are formed from a material which is hardenable upon heating and quenching or whether from a material requiring carburizing before heating and quenching in order to harden the same, these members are welded to the intermediate member 74, one at a time, in substantial accordance with the method particularly disclosed in Figs. 8 and 9 and described above, the resulting assembly taking the form illustrated in Fig. 19.

Where the members 70 and 72 are formed from a material which is hardenable upon heating and quenching without the necessity of carburization, the end member 76 will be formed of a material which is also hardenable upon heating and quenching and in such case will be welded to the member 72 before the hardening operation. Likewise where the members 70 and 72 are formed of a material requiring carburization before hardening by heating and quenching and the end member is formed from a material such as the SAE #3115 steel previously described requiring or at least not adversely affected by a carburizing treatment, it likewise will be welded to the member 72 before heating and quenching the same. Where the members 70 and 72 are formed from a material requiring carburizing before hardening by heating and quenching and the end member 76 is formed from a material which is hardenable in and of itself by heating and quenching, such as the SAE #52100 steel previously described, the assembly illustrated in Fig. 19 will be subjected to a carburizing step before the end member 76 is welded thereto. It will be observed that the end member 76 is provided in one peripheral marginal edge with a groove 92 corresponding with the grooves 46 and 48 previously described and it will be understood that in welding the end member 76 to the end of the member 72 the same general procedure as illustrated in Fig. 13 and described in connection therewith will be employed.

Referring now to the tappet in the state of completion illustrated in Fig. 20, if the members 70 and 72 and end member 76 are formed of a material which is hardenable by heating and quenching without necessitating carburization and the member 74 formed of a material which is non-hardenable upon heating and quenching, the assembly may then be suitably heated and quenched to harden the hardenable parts thereof. Where the members 70 and 72 are formed of a material requiring carburization before hardening by heating and quenching then, in order to enable subsequent machining operations on the intermediate portion 74 to be carried out, it will be necessary before hardening the same and before application of the end member 74, in other words while the assembly is in the condition shown in Fig. 19, to machine away the carburized upper and lower surfaces of the intermediate member 74. Under such circumstances it will also be necessary to machine the groove 84 in the intermediate member at this time.

Assuming in the present instance that the members 70 and 72 are formed of a material which is hardenable upon heating and quenching without the necessity of first carburizing the same, the entire assembly as illustrated in Fig. 20 is subjected to a suitable heating and quenching operation to harden the same, it being understood that the intermediate member 74 in such case will remain unhardened and, accordingly, readily machinable. In any event it will be understood that during this hardening operation the hermetically sealed chamber formed in the lower portion of the tappet remains hermetically sealed against the introduction of foreign material thereto as well as the formation of scale on its interior surfaces during the hardening operation, such interior surfaces thus remaining perfectly clean. When the hardening step has been completed, regardless of whether the parts 70 and 72 have required being carburized or not, the intermediate member 74 is then machined to provide the bore 78 therein, to provide the opening 82, and where the groove 84 has not been previously formed as will ordinarily occur where the assembly has been carburized, it will also be formed and the entire tappet subjected to final machining operation to bring it to condition for reception of the hydraulic unit 80 and consequent reception and service in an internal combustion engine adapted to receive the same.

Formal changes may be made in the specific embodiment of the invention described without departing from the spirit or substance of the broad invention, the scope of which is commensurate with the appended claims.

What I claim is:

1. In the manufacture of a hollow valve tappet including a cylindrical hollow main body portion and end members secured thereto, the step of forming a piece of tubular stock of a steel incapable of being materially hardened in and of itself upon heating and quenching, forming one of said end members of a similar type of steel and welding it to an end of said body portion, carburizing the assembly thus provided, forming the remaining end member of a steel of a character capable of being materially hardened upon heating and quenching and welding it to the remaining end of said body portion, machining away the carburized surface of certain portions of said assembly later requiring machining, heating and quenching the entire assembly, and then completing the machining operation thereon.

2. In the formation of a hollow valve tappet, including an intermediate body portion and oppositely extending main body portions secured thereto and a cam contact end member secured to one end of one of said main body portions, the step of forming an imperforate cylindrical member of a steel of non-hardenable characteristics, forming a pair of hollow cylindrical members of a steel having the characteristics of becoming hardened upon heating and quenching, welding the said hollow cylindrical members to the opposite ends of said imperforate member, welding a cam contact end member formed of a steel having the characteristic of becoming hardened upon heating and quenching to one of the remaining ends of one of said hollow cylindrical members whereby to form a hermetically sealed chamber between said imperforate member and said cam contact member, heating and quenching the resulting assembly whereby to harden said hollow cylindrical members and said cam contact end member, and then machining said imperforate member to break said hermetic seal and to provide access to the interior of the chamber.

JOSEPH H. HOERN.